(12) United States Patent
Xie

(10) Patent No.: US 11,754,253 B2
(45) Date of Patent: Sep. 12, 2023

(54) HEAT DISSIPATING STRUCTURE FOR AUTOMOTIVE LED HEADLIGHT

(71) Applicant: SHENZHEN AURORA TECHNOLOGY LIMITED, Shenzhen (CN)

(72) Inventor: Qingbo Xie, Shenzhen (CN)

(73) Assignee: SHENZHEN AURORA TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 17/509,055

(22) Filed: Oct. 24, 2021

(65) Prior Publication Data

US 2022/0341561 A1    Oct. 27, 2022

(30) Foreign Application Priority Data

Apr. 23, 2021   (CN) .......................... 202120848797.6

(51) Int. Cl.
| F21S 45/42 | (2018.01) |
| F21S 41/148 | (2018.01) |
| B60Q 1/04 | (2006.01) |
| F21V 29/60 | (2015.01) |
| F21V 29/51 | (2015.01) |

(52) U.S. Cl.
CPC ................ F21S 45/42 (2018.01); B60Q 1/04 (2013.01); F21S 41/148 (2018.01); F21V 29/51 (2015.01); F21V 29/60 (2015.01)

(58) Field of Classification Search
CPC ............................ F21S 41/148; F21V 29/51
See application file for complete search history.

(56) References Cited

U.S. PATENT DOCUMENTS

| 10,548,200 | B1* | 1/2020 | Xu | ........................ G01K 13/00 |
| 2014/0376248 | A1* | 12/2014 | Lee | ........................ F21S 43/14 |
| | | | | 362/511 |
| 2019/0211991 | A1* | 7/2019 | Lessard | ................... F21S 45/49 |
| 2021/0010651 | A1* | 1/2021 | Suetsugu | ............... F21S 41/151 |

FOREIGN PATENT DOCUMENTS

| CN | 109654452 A | * | 4/2019 | ............ F21S 41/141 |
| CN | 112050163 A | * | 12/2020 | ............ F21S 41/141 |
| KR | 20160050732 A | * | 5/2016 | ............ F21S 48/115 |
| KR | 20200048397 A | * | 5/2020 | ............ F21S 41/141 |

OTHER PUBLICATIONS

Machine translation of KR-20160050732-A, retrieved from worldwide. espacenet.com on Nov. 7, 2022 (Year: 2022).*
Machine translation of KR-20200048397-A, retrieved from worldwide. espacenet.com on Nov. 7, 2022 (Year: 2022).*

* cited by examiner

*Primary Examiner* — Andrew J Coughlin
*Assistant Examiner* — Steven Y Horikoshi
(74) *Attorney, Agent, or Firm* — Westbridge IP LLC

(57) ABSTRACT

The present disclosure discloses a heat dissipating structure for automotive LED headlight, which comprises a radiator formed integrally, wherein the radiator comprises one or more heat radiating arms. The heat radiating arm is provided with an embedded groove used for accommodating an assembly of a lamp bead board and a heat pipe. The beneficial effect of the present disclosure is that: the heat of the lamp bead board is transferred to the radiator, thus the heat dissipation efficiency has been greatly improved.

1 Claim, 4 Drawing Sheets

HEAT DISSIPATING STRUCTURE FOR AUTOMOTIVE LED HEADLIGHT

TECHNICAL FIELD

The present disclosure relates to the technical field of automotive accessories, and more particularly to a heat dissipating structure for automotive LED headlight.

BACKGROUND

In a modern aftermarket, a brightness of an LED headlight compatible with a shape of a halogen lamp is generally not as good as that of a xenon headlight. If the LED headlight needs to emit brighter light, the consumption power will become greatly large, and the most important point is heat dissipation thereof. An LED can convert electric energy into light energy, but its conversion rate is less than 30%, of which 70% will become heat. If the heat is not dissipated in time, the lamp will be burnt out in a moment; if the heat is not dissipated completely, a junction temperature will be caused, which will accelerate luminous decay of the LED, and the lifetime will not be long. Therefore, the designs of the brightness and heat dissipating system are the keys in the application of the LED headlights in automobiles, wherein how to quickly dissipate the heat is the most important problem, otherwise the brightness and lifetime of the LED cannot be improved.

Especially due to the small space within the automotive headlight, if the heat dissipation of the LED automotive headlight is not handled well, the luminous decay will be caused easily, which will affect the lifetime of the headlight. As broad users' requirements for the brightness and power of the LED automotive headlight have become increasingly higher, this kind of high-performance headlight will generate more heat, which means that a better heat dissipating structure is required to match thereof, while the existing heat dissipating structure on the market can no longer meet the requirements of the high-performance automotive headlight.

At present, there are automotive LED headlights on the market that dissipate heat by means of utilizing a liquid-cooling copper heat-conducting pipe, a copper substrate and a radiator, but the radiators thereof are split and needs to be pressed and fixed up and down with screws to form a complete radiator. Due to the radiator is broken in the middle, this kind of split heat dissipating structure seriously affects the heat dissipation efficiency and effect of the headlights.

SUMMARY

In order to overcome the disadvantages of the prior art, the present disclosure provides a heat dissipating structure for automotive LED headlight, which is integrally formed by welding an integrated radiator, a heat pipe and a copper substrate, so that the heat can be quickly transferred from a lamp bead board to heat dissipating fins, thereby reducing the inner temperature of the lamps, meeting the needs of high-brightness and high-power LED headlights and reducing the luminous decay of the LED, thus to ensure that the brightness of the LED headlights can meet the customers' needs during the lifetime. The present disclosure is achieved by the following technical solutions:

A heat dissipating structure for automotive LED headlight comprises a radiator, wherein the radiator is formed integrally and comprises one or more heat radiating arms. The radiating arm is provided with an embedded groove, and the embedded groove is used for accommodating an assembly of a lamp bead board and a heat pipe.

Furthermore, the heat pipe and the lamp bead board are weldedly connected by solder paste to form the assembly of the lamp bead board and the heat pipe.

Furthermore, the assembly is aligned with end portions of the embedded groove of the heat radiating arm.

Furthermore, the heat dissipating structure further comprises an adapter plate, and a plurality of fixing holes is provided on the adapter plate. The fixing holes are used to fix the heat pipe and the lamp bead board for forming the assembly of the lamp bead board and the heat pipe.

Furthermore, the radiator is further provided with a cooling fan.

Furthermore, the cooling fan is covered by a tail cap with a plurality of ventilation holes or is fixed on the radiator through screws.

The beneficial effect of the present disclosure is that: the heat of the lamp bead board is transferred to the radiator, thus the heat dissipation efficiency has been greatly improved.

Figure 1:
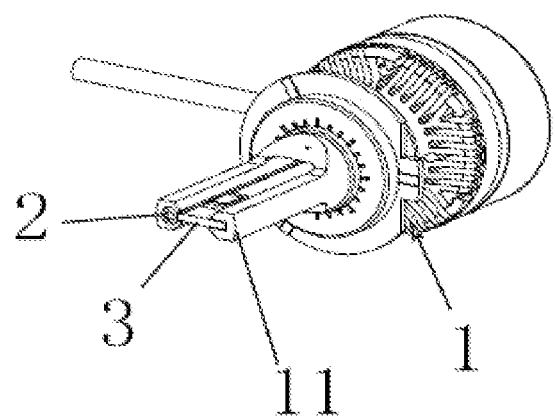
FIG. 1 is a schematic structural view of a heat dissipating structure according to Embodiment 1 of the present disclosure.

The reference numerals in drawings are shown as below: radiator 1, heat radiating arm 11, heat pipe 2, lamp bead board 3, adapter plate 4, buckle 5, gasket 6, cooling fan 7, tail cap 8, connecting wire 9.

DETAILED DESCRIPTION OF PREFERRED EMBODIMENTS

The technical solutions in the embodiments of the present disclosure will be clearly and completely described hereafter in conjunction with the accompanying drawings in the embodiments of the present disclosure. Obviously, the described embodiments are merely a part of the embodiments of the present disclosure, rather than all the embodiments. Based on the embodiments of the present disclosure, all other embodiments obtained by those of ordinary skill in the art without creative work shall fall within the protection scope of the present disclosure.

As shown in FIG. 1 to FIG. 6, a heat dissipating structure for automotive LED headlight comprises a radiator 1, wherein fins and body of the radiator 1 are formed integrally. The radiator 1 comprises one or more heat radiating arms 11, an embedded groove is provided on the heat radiating arm 11. The embedded groove is used for accommodating an assembly of a lamp bead board 3 and a heat pipe 2. The heat dissipating structure further comprises an adapter plate 4, wherein a plurality of fixing holes are provided on the adapter plate 4. The fixing holes are used for fixing the heat pipe 2 and the lamp bead board 3 to form the assembly of the lamp bead board 3 and the heat pipe 2.

The heat pipe 2 and the lamp bead board 3 are weldedly connected by solder paste to form the assembly of the lamp bead board 3 and the heat pipe 2. The assembly is aligned with end portions of the embedded groove of the heat radiating arm, and then riveted together.

A cooling fan 7 can be embedded and arranged at a rear of the radiator 1, and the cooling fan 7 is covered by a tail cap 8 with a plurality of ventilation holes. The heat generated by the lamp bead board 3 is conducted to the radiator 1 by the heat pipe 2, and then discharged outside the lamp through the cooling fan 7.

In the embodiment of the present disclosure, the heat dissipating structure for automotive LED headlight further comprises a buckle 5 for fixing the lamp. When the buckle 5 is installed, a gasket 6 used for installing the LED headlight must be installed first, which has a sealing and waterproof effect.

In the embodiment of the present disclosure, the heat dissipating structure for automotive LED headlight further comprises a connecting wire 9 used for connecting the lamp bead board 3 and a power supply (not shown in the figures). The power supply is arranged in the automobile and supplies power to the lamp bead board 3.

The implementation method in the embodiment of the present disclosure is that the heat dissipating structure is provided with one or two heat radiating arms, wherein the radiator and the heat radiating arms are integrally formed with the same medium/material, and the heat dissipation effect is better with the same material. The radiator has a hollow structure used for accommodating a mounting plate, and a specific embedded groove is provided on the heat radiating arm. A PCB lamp bead board and one or two heat pipes (liquid-cooling copper heat-conducting pipe) are welded together by solder paste, and the welded assembly of the lamp bead board and heat pipes is first placed into the radiator and set aligned with the embedded groove of the heat radiating arm of the radiator, and then riveted together.

A structure of the embedded groove is consistent with a shape of the heat pipe 2, and the embedded groove is used for accommodating the heat pipe 2.

Figure 2:
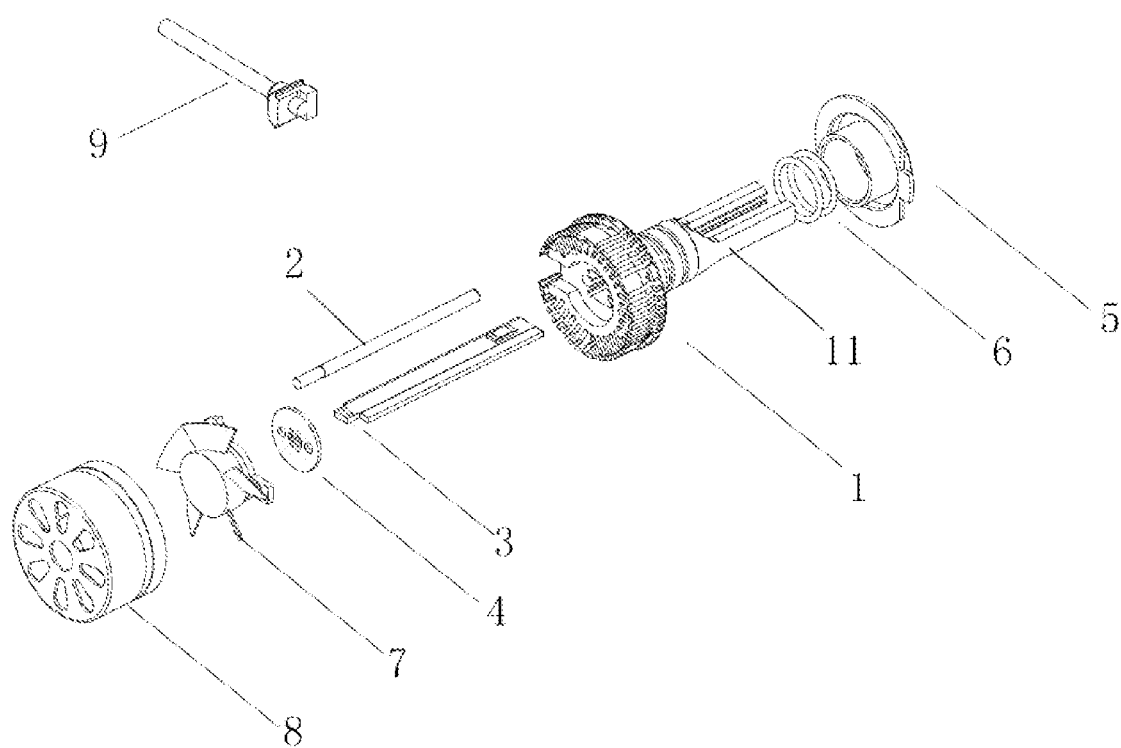
FIG. 2 is an exploded structural view of FIG. 1.
Figure 3:
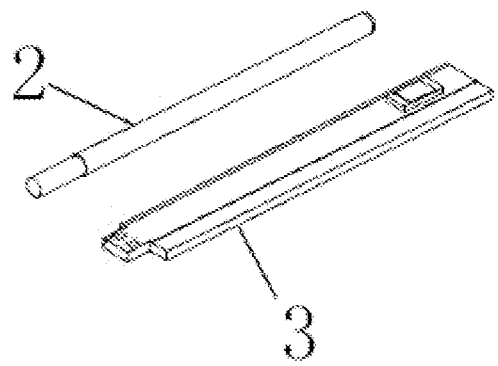
FIG. 3 is a schematic structural view of an assembly of a lamp bead board and a heat pipe in FIG. 1.

Embodiment 1 of the present disclosure is shown in FIG. 1 to FIG. 3. A heat dissipating structure for automotive LED headlight comprises a radiator 1, wherein fins and body of the radiator 1 are formed integrally. The radiator 1 comprises a heat radiating arm 11, an embedded groove is provided on the heat radiating arm 11. The embedded groove is used for accommodating an assembly of a lamp bead board 3 and a heat pipe 2. The heat pipe 2 and the lamp bead board 3 are welded together, and the heat pipe 2 is welded on a side area of the lamp bead board 3. The welded assembly of the lamp bead board 3 and the heat pipe 2 is firstly placed into the radiator 1 and set aligned with the embedded groove of the heat radiating arm 11, and then riveted together.

A cooling fan 7 can be embedded and arranged at a rear of the radiator 1, and the cooling fan 7 is covered by a tail cap 8 with a plurality of ventilation holes.

Figure 4:
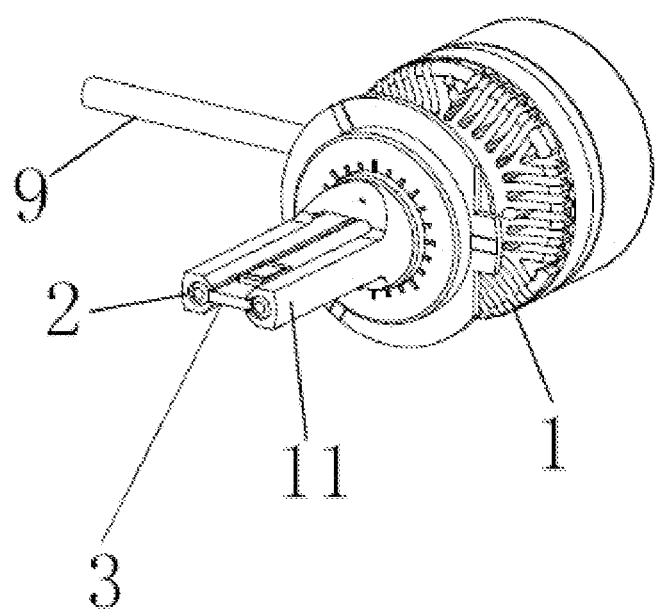
FIG. 4 is a schematic structural view of the heat dissipating structure according to Embodiment 2 of the present disclosure.
Figure 5:
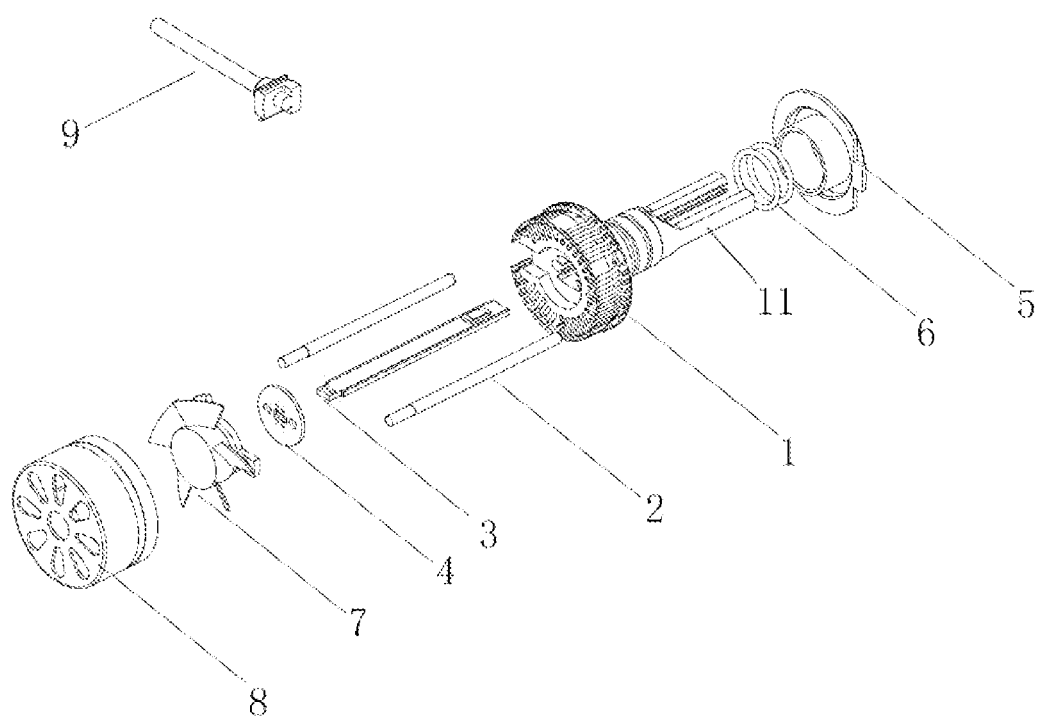
FIG. 5 is an exploded structural view of FIG. 4.
Figure 6:
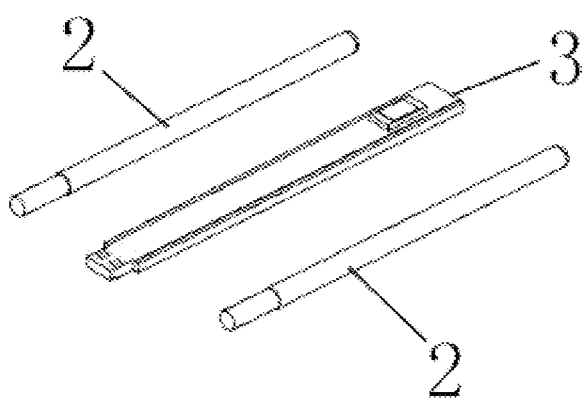
FIG. 6 is a schematic structural view of the assembly of the lamp bead board and the heat pipe in FIG. 4.

Embodiment 2 of the present disclosure is shown in FIG. 4 to FIG. 6. A heat dissipating structure for automotive LED headlight comprises a radiator 1, wherein fins and body of the radiator 1 are formed integrally. The radiator 1 comprises two heat radiating arms 11, each of the heat radiating arms 11 is provided with an embedded groove respectively. The embedded grooves are used for accommodating an assembly of a lamp bead board 3 and heat pipes 2. The two heat pipes 2 and the lamp bead board 3 are welded together, and the two heat pipes 2 are welded on both sides of the lamp bead board 3 respectively. The welded assembly of the lamp bead board 3 and the heat pipes 2 is firstly placed into the radiator 1 and set aligned with the embedded grooves of the heat radiating arms 11, and then riveted together.

A cooling fan 7 can be embedded and arranged at a rear of the radiator 1, and the cooling fan 7 is covered by a tail cap 8 with a plurality of ventilation holes.

Figure 7:
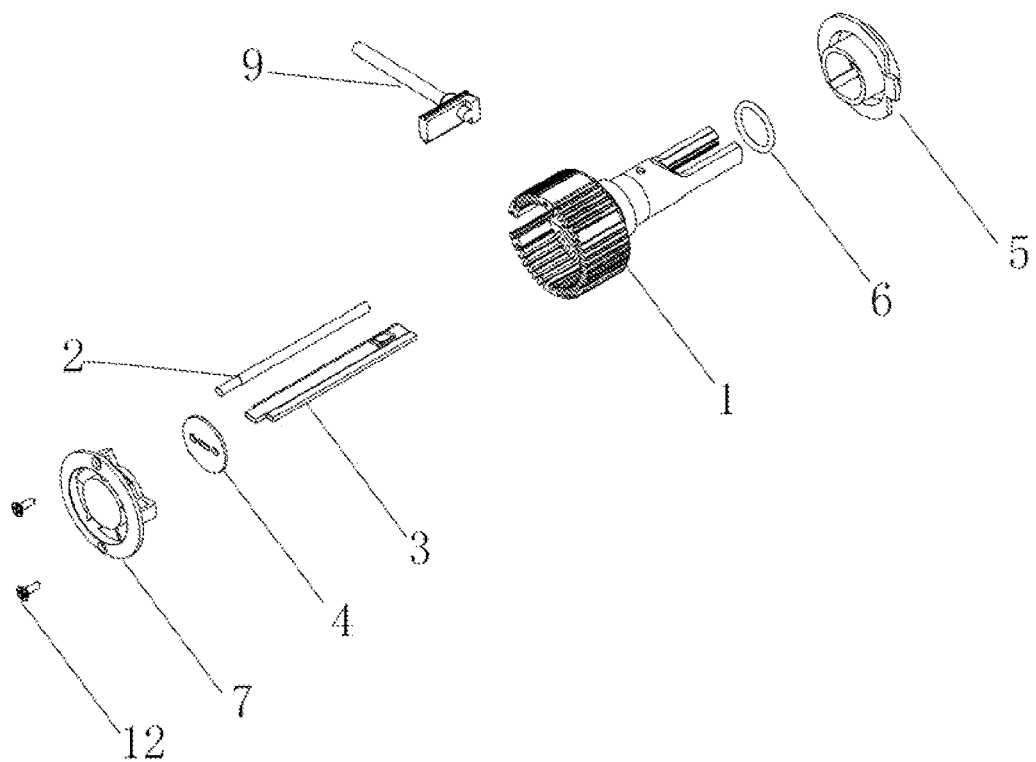
FIG. 7 is a schematic structural view of the heat dissipating structure according to Embodiment 3 of the present disclosure.

Embodiment 3 of the present disclosure is shown in FIG. 7. A heat dissipating structure for automotive LED headlight is composed of an integrated radiator 1, a PCB lamp bead board 3, a liquid-cooling copper heat-conducting pipe 2, an adapter plate 4, a cooling fan 7, a tail cap, a connecting wire 9, a buckle 5, and a waterproof sealing ring 6. Fins and body of the radiator 1 are integrally formed, wherein the radiator 1 comprises a heat radiating arm, and an embedded groove is provided on the heat radiating arm. The embedded groove is used for accommodating an assembly of a lamp bead board 3 and a heat pipe 2. The heat pipe 2 and the lamp bead board 3 are welded together, and the heat pipe 2 is welded on a side area of the lamp bead board 3. The welded assembly of the lamp bead board 3 and the heat pipes 2 is firstly placed into the radiator 1 and set aligned with the embedded groove of the heat radiating arms of the radiator 1, and then riveted together.

The cooling fan 7 can be embedded and arranged at a rear of the radiator 1, and the cooling fan 7 is fixed on the radiator 1 through screws 12.

Figure 8:
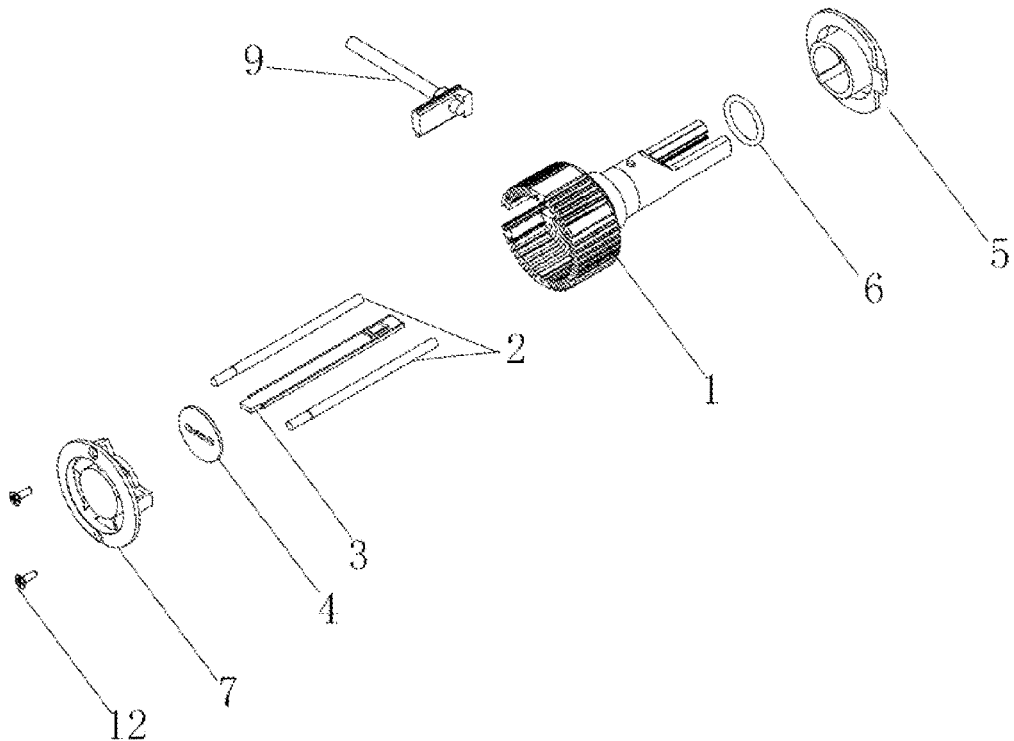
FIG. 8 is a schematic structural view of the heat dissipating structure according to Embodiment 4 of the present disclosure.

Another embodiment of the present disclosure is shown in FIG. 8. A heat dissipating structure for automotive LED headlight is composed of an integrated radiator 1, a PCB lamp bead board 3, liquid-cooling copper heat-conducting pipes 2, an adapter plate 4, a cooling fan 7, screws 12, a connecting wire 9, a buckle 5, and a waterproof sealing ring 6. Fins and body of the radiator 1 are integrally formed, wherein the radiator 1 comprises two heat radiating arms, each of the heat radiating arms is provided with an embedded groove respectively. The embedded grooves are used for accommodating an assembly of a lamp bead board 3 and heat pipes 2. The two heat pipes 2 and the lamp bead board 3 are welded together, and the two heat pipes 2 are welded on both sides of the lamp bead board 3 respectively. The welded assembly of the lamp bead board 3 and the heat pipes 2 is firstly placed into the radiator 1 and set aligned with the embedded groove of the heat radiating arms of the radiator 1, and then riveted together.

The cooling fan 7 can be embedded and arranged at a rear of the radiator 1, and the cooling fan 7 is fixed to the radiator 1 through the screws 12.

Although the embodiments of the present disclosure have been illustrated and described, those of ordinary skill in the art should understand that various changes, modifications, substitutions and variations can be made to these embodiments without departing from the principles and spirits of the present disclosure, and the scope of the present disclosure is defined by the append portioned claims and their equivalents.

What is claimed is:

1. A heat dissipating structure for automotive LED headlight, comprising a radiator formed integrally as a single piece along an axial direction of the heat dissipating structure and an adapter plate, wherein the radiator comprises one or more heat radiating arm, the heat radiating arm is provided with an embedded groove, the embedded groove is used for accommodating an assembly of a lamp bead board and a heat pipe, wherein the heat pipe and the lamp bead board are connected for forming the assembly of the lamp bead board and the heat pipe, and wherein the assembly is aligned with end portions of the embedded groove of the heat radiating arm, and then formed together;

a plurality of fixing holes are provided on the adapter plate; the fixing holes are used to fix the heat pipe and the lamp bead board for forming the assembly of the lamp bead board and the heat pipe.

* * * * *